United States Patent Office 3,577,363
Patented May 4, 1971

3,577,363
CELLULAR PLASTICS MATERIAL CONTAINING POLYSTYRENE AND A PROCESS FOR ITS MANUFACTURE
Oluf Walter Henry Klug, Stockholm, Sweden, assignor to AB Electrolux, Stockholm, Sweden
No Drawing. Filed June 20, 1969, Ser. No. 835,214
Claims priority, application Sweden, July 5, 1968, 9,319/68
Int. Cl. C08f *47/10;* C08g *53/10*
U.S. Cl. 260—2.5
10 Claims

ABSTRACT OF THE DISCLOSURE

A material consisting of closed cells of polystyrene which are surrounded by cured urea formaldehyde resin is produced in the following manner: Small, enexpanded polystyrene particles are mixed with urea formaldehyde resin in a liquid medium; the urea formaldehyde resin is then converted to a foam and cured in the form of this foam without any substantial expanding of the polystyrene particles; after the curing step, the polystyrene particles are expanded by heating.

---

This invention is concerned with cellular plastics on a urea formaldehyde and polystyrene basis and with a process for the manufacture of these plastics materials.

Still cellular plastics of polystyrene have been employed for about twenty years as heat insulation materials. They have very good heat insulating properties and are light in weight. Thus for instance, cellular plastics having a bulk density of 15 to 20 kg./cubic meter and a lambda value of between 0.026 and 0.030 kcal./m.$^{-1}$/h$^{-1}$/° C.$^{-1}$ have been employed in actual practice. This type of cellular plastics material does not absorb water or steam and is resistant to acids, alkalis and salt water. Also, since it possesses good resistance to ageing, it is very suitable for insulation applications where it is desired that the inulating effect should remain constant for prolonged periods of time.

Such cellular plastics of polystyrene have been employed for many practical purposes, for example in ships, houses and chambers equipped with cold-storage facilities, in ceiling and wall insulations, in tanks or cisterns, and in pipe insulations. The cellular plastics produced according to this invention can also successfully be employed for these purposes, but its usefulness is not retricted to them.

The aforesaid known polystyrene material is produced in generally the following manner: A starting material in the form of 0.1–0.3 mm. granules is heated in water or steam at 95–99° C. By this treatment—which is called "preforming"—the grains are caused to swell to about 20–40 times their original volume, so that they are transformed into beads of for instance 2–4 mm. diameter. The beads are introduced into a mold in which they are exposed to the action of steam at about 130° C. This steam treatment will cause an additional swelling of the beads, and under the influence of the temperature conditions applied in combination with the autogenic pressure the walls of the beads will fuse together, to thus form a stiff body. The body may if desired be cut with cutting tools. In this manner materials of very regular cell structure and excellent insulation properties may be obtained.

However, this known cellular plastics of polystyrene unfortunately also has other properties due to which it cannot be employed for some purposes where it would actually be desirable to utilize its good insulation properties. Its resistance to pressure is so low that it cannot be employed as a constructional bearing element as such, but only in combination with bearing elements of other materials. Moreover, this cellular plastics has other properties by which its usefulness is impaired to a still higher degree than by its low resistance to pressure: Already at a temperature as low as 70° C. the cell walls will soften, with constant collapsing of the entire cell structure. At temperatures above 100° C. the polystyrene material will melt. If the temperature is raised still further it may give rise to ignition of this easily inflammable and burnable material, with abundant evolution of smoke.

More recently, cell materials of polystyrene have been developed which are said to have a low degree of inflammability, but actually this only means that the temperature at which ignition occurs is slightly higher. In all essential respects the properties of the cellular plastics are still substantially the same as before, and consequently there is and remains a great demand for a material that is more suitable to stand high temperatures—a material that will not burn so easily and will not evolve large amounts of smoke when heated to very high temperatures.

These demands are fulfilled by a cell plastics material according to the present invention. This cellular plastics material consists of closed cells of polystyrene surrounded by cured urea formaldehyde resin. The weight ratio of polystyrene to urea formaldehyde resin is preferably within the range of from 1:10 to 1:20. The process of this invention for producing the said novel cellular plastics comprises the steps of mixing unexpanded grains of polystyrene with a curable urea formaldehyde resin in a liquid, preferably aqueous medium, followed by foaming the urea formaldehyde resin and curing the foam without any substantial expanding of the polystyrene grains, and then expanding the polystyrene grains dispersed in the cured foam by means of supplying heat, the total volume of the foam being maintained practically unchanged during this expanding step.

The aforesaid statement "without any substantial expanding" means that in this stage the grains are expanded only to max. 3–5 times their original size. Their original size may suitably be within the range of 0.1–0.5 mm. preferably 0.1–0.3 mm. In the preparation of the starting mixture, the weight ratio of polystyrene grains to urea formaldehyde resin may suitably be within the range of from 1:10 to 1:20, based on the dry substance weight. Preferably the urea formaldehyde resin should have a molecular weight of at least or above 110, for instance within the range of 110–200.

A proceeding that may be adopted according to one embodiment of this invention is as follows:

The curable urea formaldehyde resin employed as one of the starting materials may be a commercial urea formaldehyde precondensate having a molecular weight exceeding 110, a dry matter content of 72% by weight and a formaldehyde content of 7% by weight based on the dry matter. This precondensate is admixed with water so as to adjust its viscosity to a more suitable value for the subsequent treatment; due to the addition of water in this stage the foam subsequently produced will be more voluminous, so that the final product will have a lower bulk density than it would have in case no water were added. As will be appreciated, a low bulk density is often highly desirable, for economic and other reasons.

A suitable amount of polystyrene grains is added (for example 1 part by weight of polystyrene grains per 15 parts by weight of urea formaldehyde resin), the grains being in a non-expanded state and having a size lying for example within the aforesaid range of 0.1 to 0.5 mm. If it is desired to produce a body of cellular plastics which not only has heat-insulating properties but also possessse a mechanical strength exceeding that of ordinary polystyrene foam one may add certain fillers, for instance a wood fiber material such as wood meal or wood chips, or for instance glass wool or mineral wool, to the mixture of polystyrene grains and urea formaldehyde precondensate. This addition may take place before, during or after the foaming step. The mass is mixed thoroghly and is foamed by mechanical stirring or whipping, or by a chemical process, for example by adding chalk and acid (especially phosphoric acid, formic acid or oxalic acid). The acid also constitutes a curing agent for the foam.

When the mixture has been foamed to a desired volume, and if no curing agent has been added as yet up to them, an acidic curing agent suhc as for instance phosphoric acid, formic acid or oxalic acid is added.

The thus resultant mass of liquid foam consisting of urea formaldehyde resin with the polystyrene grains admixed therein, as well as, if desired, certain additives, and having small air bubbles enclosed within the foam, must be stable for a sufficient period to permit introduction of the mass into a suitable mold in which the mass will gel and then harden, to give a cured product. If required stabilizing agent may be added to the mass in the mixer to thereby increase the surface tension of the resinous mixture. An example of such a stabilizing agent is a polyvinyl acetate emulsion which stabilized the small air bubbles by forming a thin film. By means of this stabilizer film, the cell walls surrounding the air bubbles are maintained intact efficiently and long enough to allow a convenient time interval for the transfer of the mixture into the mold. A further additive that is suitable is sodium thiosulfate, for the purpose of binding any such excess of formaldehyde that may be present in the precondensate. For instance, if the aforesaid commercial precondensate containing 7% of formaldehyde is employed, then not all of the formaldehyde will be "consumed" in the curing step. It is therefore suitable to add 5% of sodium thiosulfate based on the dry weight of the urea formaldehyde resin.

In the curing step, the foam in the mold hardens by way of an exothermic reaction during which the temperature rises progressively from room temperature (about 20° C.) to 45–50° C. within the time interval up to the final stage of the hardening or curing process, said final stage being reached after about 30 minutes. During such hardening or curing—which is thus effected without any external supply of heat—there does not occur any such expansion of the polystyrene grains as in the so-called pre-forming step of the known method described above; what actually occurs is only a slight expansion, of the order of magnitude of about 3 to 5 times the original grain size.

The cured foam body with its built-in polystyrene grains is then taken out of the mold. It has an open cell structure. In this stage, that is, when it is taken out, it has a residual moisture content that should be eliminated; the foam body is therefore dried in air at a temperature of about 20–25° C., suitably for about one 24-hour day.

The foam body thus obtained which may either be a big block suitable for being subdivided into smaller parts, for example by being sawed up to form panels or slices, or may consist of a body of some special desired shape, is introduced into a mould provided with reinforcements for resisting interior pressure and with inlet and outlet conduits for a heating medium, suitably steam. It is possible to introduce into this mold either a foam body the contours of which correspond to those of the mold cavity, or individual parts of a foam body produced in the aforesaid manner. After the mold has been closed, steam (or other heating medium) of for example about 130° C. is admitted for a short period of time which may be within the range of from 10 to 20 seconds. This treatment will cause the pholystyrene grains to expand and to thus effect a change in the structure of the cell body; prior to this stage, the body was an open cell structure with polystyrene grains dispersed therein, whereas the expansion of the polystyrene grains converts it to a structure comprising closed cells of polystyrene surrounded by urea formaldehyde resin. The temperature at which the polystyrene grains are expanded will suitably be within the range of from 130 to 145° C., preferably 128 to 130° C.

If temperatures as high as about 145° C. are employed the heating time must be very short, about 10–15 seconds. The polystyrene grains are believed to have a very important function already in the stages immediately after the foaming of the urea formaldehyde resin: As mentioned above, the temperature of the mass in the gelling and curing step rise spontaneously to 45–50° C., thereby causing a certain degree of expansion of the air bubbles trapped within the foam. At the same time, this rise in temperautre will cause the polystyrene grains to increase in volume, although only to a small extent. The cell walls which are thus "reinforced:" by the slightly increased grains of polystyrene are pressed against neighboring "reinforced" cell walls under the action of the expansion pressure until the maximum pressure tolerated has been reached, whereupon the cell walls will burst, thus causing the polystyrene grains to become exposed in the open cells. At that moment the curing process has reached its final stage, and the cell structure thus obtained has been produced under pressure (autogenous pressure) whereby the mechanical strength of the cured foam body is increased. The aforesaid exposure of the polystyrene grains provides for an optimum expansion of the grains in the subsequent step of the process. For instance, if the expansion is effected by means of supplying steam, a direct and intimate contact will be established between the steam and the exposed grains; the latter will increase in volume so as to fill out the entire space in the cell system.

As far as can be ascertained, the presence of the polystyrene grains is responsible for the bursting of the cell walls "at the right moment," and for giving the final product the special structure that is of such essential importance for its properties.

The cellular body thus obtained has the same, excellent heat insulating properties as the known polystyrene cell product, but it has in addition the further important advantage of being highly resistant to ignition. This is a very salient feature of the novel product: It is insusceptible to burning; at very high temperatures of said 200–300° C. it will be subject to charring, instead of burning, the charring being accompanied by only little formation of smoke and the gases evolved being much less dangerous than the gases formed when known types of cellular polystyrene materials are exposed to temperatures even as low as about 150° C.

It is also possible to produce, by the process according to this invention, bodies of cellular plastics having such properties as to make them suitable for insulation of roofs; materials can be obtained having sufficient mechanical strength in order that panels of 50 mm. thickness cut out therefrom will stand the pressure stresses involved when a mechanic or fitter is walking on a panel that has been placed in position. Such a panel should contain a certain amount of filler serving as a cell structure reinforcement. This will increase the bulk density of the product; the greater the amount of filler added, the higher will be the bulk density. The bulk density may range from for instance 50 to 400 kg./cubic meter, depending on the purpose for which the product is to be employed. The amount of filler added will in these cases be from 25% to 80% based on the total weight of the ingredients in the foam mass (urea formaldehyde resin, polystyrene grains and filler plus any further additives, if employed, all based on dry weight). The best fillers are wood meal, sawdust and bark, although many other materials may be employed such s glass wool, mineral wool or asbestos. It is also possible to employ mixtures of these fillers.

It is often desirable that the fillers should not absorb major amounts of liquid (water). To counteract absorption they may be impregnated with an anti-absorbant prior to being incorporated in the mass. The anti-absorbant material should be one remaining absolutely inert during the various steps of the process, that is, it should neither swell nor react with the other components present. A particularly good impregnating agent for the fillers is a polyvinyl acetate emulsion; but of course various other inert plastics materials may be employed for the impregnation. The addition of such an inert plastics material may be suitable also in the embodiments where the starting mixture is prepared without fillers but with the stabilizing agents mentioned above.

By the process of this invention it is possible to manufacture the cellular plastics material in the form of large-size blocks which are to be subdivided into slices or panels for practical use. Alternatively, however, the last step of the process may be carried out with individual pieces of the foam in a mold having a mold cavity configuration corresponding to the desired final shape of the product to be manufactured; in the body thus obtained, which is then taken out of the mold, the individual pieces have been welded together to thus form a unit of the desired shape. It is possible in this manner to produce wall portions for house building in the form of structural foam elements ready to fit around windows and doors, wall surfacings, fittings, fixtures and attachments of all kinds, pipes and plumbings, plugs and other accessories for electric wiring and so on.

The below examples serve to further illustrate this invention, but it will be appreciated that the scope of the invention is not in any respect restricted to these specific embodiments. The parts and percentages in the examples are parts by weight and percent by weight, respectively.

EXAMPLE I

Light-weight, non-burning insulation

A urea formaldehyde precondensate in a 72% aqueous solution and containing 7% of formaldehyde, based on the dry substance weight, was mixed with polystyrene grains in the proportion of 9 parts of precondensate per 1 part of polystyrene, the mixing being effected in a conventional mixer provided with mechanical stirring means. Then 10 parts of polyvinyl acetate emulsion were added. Moreover 5 parts of sodium thiosulfate were added. The components were thoroughly mixed, and water was added to prevent the viscosity of the mixture from becoming too high. To the mixture thus prepared there were then added about 5 parts of a neutral fermenting agent, viz., "BASF 414," whereupon the mass in the mixer was converted to a foam by vigorous whipping. "BASF 414" is an inert foaming agent. If the mixture has too high a viscosity before the foaming stage the walls of the foam cells may become too thick, so that the bulk density of the product will be too high. The foam mass was allowed to grow to about 25 times the volume of the unfoamed mass, and when this stage was reached an acidic curing agent, in this case, concentrated (85%) phosphoric acid, was added in amount of 3 parts based on the dry substance weight of the urea formaldehyde resin, and was mixed intimately with the foam. The foam mass with the phosphoric acid incorporated therein was transferred from the mixer to a mold in which the final curing was effected. After completion of the curing, which took 25 minutes, the resultant body was removed from the mold and was dried for 24 hours at room temperature. The foam body thus obtained which contained the polystyrene grains in a substantially unexpanded state had a bulk density of 30 kg. per cubic meter. It was placed into a mold equipped with inlet and outlet conduits. Steam at 130° C. was admitted into the mold for 18 seconds. Due to this steam heat treatment, the polystyrene grains in the foam body expanded so as to fill out the open cell system in the resin, to thus give a homogeneous and compact product.

EXAMPLE II

Light-weight, non-burning insulation

The process of Example I was repeated with the following starting materials:

| Ingredients | (a) Amount, grams | (b) percent concentration in (a) |
| --- | --- | --- |
| Urea formaldehyde precondensate (aqueous solution) | 750 | 72 |
| Polustyrene | 100 | 100 |
| Polyvinyl acetate (emulsion) | 75 | 52 |
| Sodium thiosulfate | 75 | 100 |
| Foaming agent: "BASF 414" (solution) | 60 | 50 |
| Curing agent: phosphoric acid | 25 | 85 |
| Water | 150 | |

EXAMPLE III

Medium weight foam presenting high resistance to pressure

The composition of Example II may be employed also for producing foam bodies having a bulk density of 50–100 kg./cubic meter. The bulk density as well as other properties of the foam body can be modified by addition of fillers to the mass. Suitable fillers are wood meal, fine (sifted) wood chips, mica materials such as vermiculite, glass wool, rock wool or similar light weight materials; if desired several of these filler materials may be incorporated in the same mass.

50 kg. of the resinous mass according to Example II were formed by whipping so as to acquire a volume of 1 cubic meter. 50 kg. of wood meal were added to the liquid foam mass, the total weight of the mass then being 100 kg. The wood meal, being a bibulous material, absorbed a certain portion of the foam so that the volume remained 1 cubic meter, the bulk density, therefore, being 100 kg./cubic meter. The foam was cured, dried and exposed to heat in a mold for expansion of the polystyrene grains, in the same manner as described in Example 1.

Although certain representative embodiments of the invention have been described above for illustrative purposes, it should be noted that the invention is not in any way restricted to those embodiments; numerous changes and modifications therein may be made without departure from the scope and spirit of this invention.

I claim:
1. A process for producing a cellular plastics material in which grains of polystyrene are mixed in an unexpanded state with a curable urea formaldehyde resin in a liquid medium, the mixing step being followed by first foaming the urea formaldehyde resin and curing the foam while maintaining the polystyrene grains dispersed therein in a substantially unexpanded state, and then, after completion of the curing, expanding the polystyrene grains by means of supply heat while maintaining the total volume of the foam substantially unchanged thereby producing a cellular plastics material comprising closed cells of polystyrene surrounded by cured urea formaldehyde resin.

2. A process as claimed in claim 1, in which unexpanded polystyrene grains having a size of 0.1–0.5 mm. are mixed with the urea formaldehyde resin in an aqueous medium.

3. A process as claimed in claim 1, in which at least one filler selected from the group consisting of glass wool, mineral wool, unimpregnated wood fiber materials and wood fiber materials impregnated with absorption-decreasing agents is added prior to the curing step.

4. A process as claimed in claim 1, in which a filler comprising a wood fiber material impregnated with polyvinyl acetate is added prior to the curing step.

5. A process as claimed in claim 1, in which a curing agent selected from the group consisting of phosphoric acid, formic acid and oxalic acid is added prior to the curing step.

6. A process as claimed in claim 1, in which sodium thiosulfate is added to the initial mixing step.

7. A process as claimed in claim 1, in which the polystyrene grains are expanded at a temperature of 128–145° C.

8. A process as claimed in claim 1, in which the polystyrene grains are expanded under the action of steam.

9. A process for producing a cellular plastics material in which grains of polystyrene having a size of 0.1-0.5 mm. are mixed with a curable urea formaldehyde resin in an aqueous medium, the mixing step being followed by foaming the urea formaldehyde resin and curing the foam thus obtained in a mold while maintaining said grains in a substantially unexpanded state, drying the cured foam product with the substantially unexpanded polystyrene grains dispersed therein and exposing the cured and dried product in a mold to the action of steam at 128-145° C., for 10-20 seconds to expand said grains while maintaining the total volume of the product substantially unchanged, thereby producing a cellular plastics material comprising closed cells of polystyrene surrounded by cured urea formaldehyde resin.

10. A process as claimed in claim 9, in which the polystyrene grains are mixed with 10 to 20 times their weight of urea formaldehyde resin in the initial mixing step.

References Cited

UNITED STATES PATENTS

| | | | |
|---|---|---|---|
| 2,806,509 | 9/1957 | Bozzacco et al. | 260—2.5B |
| 3,023,136 | 2/1962 | Himmelheber et al. | 260—2.5B |
| 3,124,626 | 3/1964 | Graham et al. | 260—2.5B |
| 3,245,829 | 4/1966 | Blauliel et al. | 260—2.5B |

JOHN C. BLEUTGE, Primary Examiner

U.S. Cl. X.R.

260—17.3, 17.4, 39, 41, 855; 264—46, 50, 53